United States Patent Office 3,380,965
Patented Apr. 30, 1968

3,380,965
PROCESS OF PREPARING ACETYLENICALLY
UNSATURATED POLYCARBONATES
Markus Matzner, Edison Township, N.J., assignor to
Union Carbide Corporation, a corporation of New
York
No Drawing. Filed Feb. 10, 1964, Ser. No. 343,453
6 Claims. (Cl. 260—47)

This invention relates to linear polymers containing acetylenic unsaturation therein. This invention more particularly relates to polyesters, polycarbonates and polyurethanes containing acetylenic unsaturation therein.

Heretofore, acetylenic polymers have not been generally known. However, the interatomic distance between the carbon atoms in an acetylenic or triple bond being shorter than those in a double or single bond is believed to impart different physical properties to polymer chains containing them vis-à-vis their olefinic or saturated aliphatic counter-parts. Thus, for example, the incorporation of a triple bond in a polymer backbone renders the polymer stiffer and denser, raises the glass transition temperature and melting point, improves the adhesion to other surfaces and lowers the gas and water vapor permeabilities. In addition, different or enhanced chemical reactivity is introduced into the polymer chain. For example, the triple bond acts as a site for crosslinking, oxidation, halogenation, sulfonation, etc.

Previous attempts to make acetylenically unsaturated polyesters with aliphatic dibasic acids recorded in the technical literature have produced only low molecular weight polymers having limited utility. Similarly, low molecular weight acetylenically unsaturated polyurethanes were thermally unstable.

However, it has now been discovered that acetylenically unsaturated high polymers having very useful physical properties and which are thermally stable up to temperatures as high as 300° C. can be prepared from acetylenic glycols having the structure

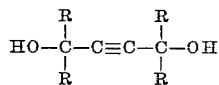

in which R is hydrogen or a lower hydrocarbon group as more particularly set forth below. Such acetylenic glycols as employed herein now provide a useful medium for providing for the first time the acetylenically unsaturated polymers of this invention which provide themselves new and important physical properties and in addition the triple bond provides an active site upon which various chemical reactions can be performed.

The polymers of the present invention are characterized as having the repeating unit represented by the structure

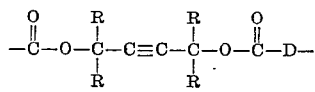

with the number of such repeating units being sufficiently high as to represent a normally solid high polymer. In the above structure the R groups represent the same or different monovalent radicals such as hydrogen or lower hydrocarbon groups, particularly those having 10 or less carbon atoms, as for examply alkyl, cycloalkyl, aryl and the like groups as is illustrated by such groups as methyl, ethyl, propyl, isopropyl, hexyl, octyl, 2-ethyl hexyl, cyclopentyl, cyclohexyl, phenyl, tolyl, xylyl, naphthyl, mesityl, cumyl and the like radicals. The divalent radical D of the above structure is at least one of the groups represented by the formula (a) —Q—

(b) —O—Q—O—

(c) 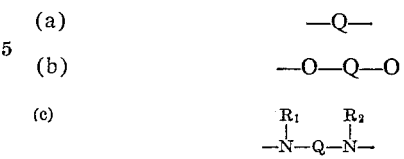

in which Q represents a divalent hydrocarbon group, and wherein each of $R_1$ and $R_2$ represents a monovalent lower hydrocarbon group as represented by R above, or together represents a divalent alkylene bridge between the nitrogen atoms when Q is also an alkylene bridge, such as would result from piperazine.

Thus as is readily seen, the polymers of this invention can be polyesters when D is represented by the structure (a) above, or a polycarbonate when D is represented by the structure (b) above or a polyurethane when D is the structure represented by (c) above. It is, of course, contemplated that interpolymers are also possible in which different D groups are present in the same polymeric chains, as for example, in a poly(carbonate-urethane).

In this invention, Q can be any divalent hydrocarbon group, even those having as few as one or as many as 25 or more carbon atoms as for example, any of the alkylene radicals and preferably ethylene, tetramethylene, pentamethylene and hexamethylene radicals, as well as cycloalkylene and arylene radicals such as the 1,3-cyclobutylene, 1,3-cyclopentylene, 1,4-cyclohexylene, 2-cyclohexen-1,4-ylene, 2,5-cyclohexadien-1,4-ylene, 1,4-phenylene, 1,8-naphthylene, 2,4-tolylene, 2,5-tolylene and similar groups as well as mixed phenylene bonded groups such as may result from the residues of polynuclear phenols such as those having the general formula

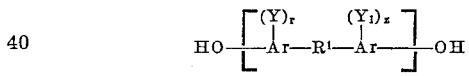

in which event the hydrocarbon Q group represents that residue between the brackets in which Ar is an aromatic divalent hydrocarbon such as phenylene, Y and $Y_1$ which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, r and z are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or is a divalent radical including, for example,

—O—, —S—, —SO—, —SO$_2$—, and —S—S— and divalent hydrocarbon radicals such as alkylene, alkylidene; cycloaliphatic e.g., cycloalkylene and cycloalkylidene, halogenated, alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group or a sulfur containing group such at sulfoxide, and the like.

Examples of specific dihydric polynuclear phenols include, among others:

The bis-(hydroxyphenyl)-alkanes such as 2,2-bis-(4-hydroxyphenyl)propane,
2,4'-dihydroxydiphenylmethane,
bis-(2-hydroxyphenyl)methane,
bis-(4-hydroxyphenyl)methane,
bis-(4-hydroxy-2,6-dimethyl-3-methoxyphenyl)methane,
1,1-bis-(p-hydroxyphenyl)ethane,
1,2-bis(4-hydroxyphenyl)ethane,
1,1-bis-(4-hydroxy-2-chlorophenyl)ethane,
1,1-bis-(3-methyl-4-hydroxyphenyl)ethane,
1,3-bis(3-methyl-4-hydroxyphenyl)-propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
bis-(4-hydroxyphenyl)cyclohexylmethane,
1,2-bis-(4-hydroxyphenyl)-1,2-bis-(phenyl)-propane,
2,2-bis-(4-hydroxyphenyl)-1-phenyl-propane and the like;

Di(hydroxyphenyl)sulfones such as bis-(4-hydroxyphenyl)-sulfone,
2,4'-dihydroxydiphenyl sulfone,
5'-chloro-2,4'-dihydroxydiphenyl sulfone,
5'-chloro-4,4'-dihydroxydiphenyl sulfone, and the like;

Di(hydroxyphenyl)ethers such as bis-(4-hydroxyphenyl)-ether,
the 4,3'-, 4,2'-, 2,2'-, 2,3'-dihydroxydiphenyl ethers,
4,4'-dihydroxy-2,6-dimethyldiphenyl ether,
bis-(4-hydroxy-3-isobutylphenyl)-ether,
bis-(4-hydroxy-3-isopropylphenyl)-ether,
bis-(4-hydroxy-3-chlorophenyl)-ether,
bis-(4-hydroxy-3-fluorophenyl)-ether,
bis-(4-hydroxy-3-bromophenyl)-ether,
bis-(4-hydroxynaphthyl)-ether,
bis-(4-hydroxy-3-chloronaphthyl)-ether,
bis-(2-hydroxy diphenyl)-ether,
4,4'-dihydroxy-2,6-dimethoxydiphenyl ether,
4,4'-dihydroxy-2,5-diethoxydiphenyl ether, and the like.

Also suitable are the bisphenol reaction products of 4-vinyl-cyclohexene and phenols e.g., 1,3-bis-(p-hydroxyphenyl)-1-ethylcyclohexane, and the bisphenol reaction products of α-pinene or its isomers and phenols as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable polymers result from those wherein Q has the formula

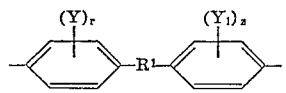

wherein Y and $Y_1$ are as previously defined, $r$ and $z$ have values from 0 to 4 inclusive, and $R^1$ is a divalent saturated aliphatic hydrocarbon radical, particularly alkylene and alkylidene radicals having from 1 to 3 carbon atoms, and cycloalkylene radicals having up to and including 9 carbon atoms.

It is understood that wherever cis and trans geometrical isomers exist in the chemical structures discussed in this invention, that both are included unless specified to the contrary.

Acetylenically unsaturated polyesters

The preferred method for the preparation of acetylenically unsaturated polyesters is the condensation of an acetylenic diol with a diacyl halide. This polymerization can be shown graphically as follows:

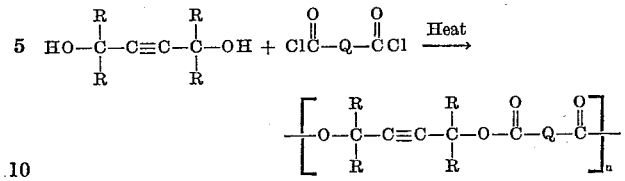

wherein $n$ has a value sufficiently high as to afford a solid polymer and Q and R are as described previously.

Although diacyl chlorides are preferred for economic reasons, other acyl halides can also be employed, if desired, e.g., the diacyl fluorides, bromides or iodides.

This polymerization reaction can be effected in a temperature range of about 30–180° C. or higher. It is preferred, however, to use a range of about 100–165° C.

Although it is not necessary to employ a solvent, it is preferable to do so because of the better temperature control achieved with one and the lessening of the possibility of overheating which could result in crosslinking. Preferred solvents are: aromatic hydrocarbons, such as toluene, ethylbenzene, isopropylbenzene, o-, m- and p-xylene, o-dichlorobenzene, and the like; chlorinated aliphatic hydrocarbons, such as s-tetrachloroethane, 1,1,1,2-tetrachloroethane, pentachloroethane, 1,1,2-trichloroethane and the like; and mixtures of toluene and o-dichlorobenzene, toluene and s-tetrachloroethane and the like.

Since hydrogen chloride is produced as a by-product in this condensation, its elimination or removal during the reaction is desirable. For this purpose a stream of dry nitrogen, argon, helium or carbon dioxide can be passed through the reactants. However, it is not essential that the above step be taken.

The polyester product can be recovered as a residue by evaporating off any remaining reactants or by precipitation or coagulation in a non-solvent which is miscible with the polymerization solvent. For this purpose alcohols such as methanol, ethanol, isopropanol can be used or ketones such as acetone or methyl ethyl ketone.

In general, it is preferred that the acetylenic diol and acyl chloride be present in stoichiometric amounts in order to obtain high molecular polyesters. However, other than stoichiometric amounts of the reactants can be utilized in this invention.

Conventional polymerization equipment is adequate for the preparation of these polyesters, since atmospheric pressures suffice. Subatmospheric or superatmospheric pressures can be employed if desired, but appropriate pressure vessels will then be required as reactors for the polymerization.

As to the reactants themselves, it is particularly preferred to use diacyl chlorides of aromatic dibasic acids, as for example, terephthalic, isophthalic, phthalic, isomeric diphenic and benzophenone dicarboxylic acids as well as their nitro-, halo-, cyano and alkyl substituted homologs. However, cis and/or trans cycloalkylene dicarboxylic acids such as cyclobutane, cyclopentane, and cyclohexane dicarboxylic acids can also serve in the capacity as the dibasic acid as can aliphatic dibasic acids such as adipic, azelaic, sebacic, tetramethyl succinic acids and the like.

Acetylenic glycols appropriate for the preparation of these esters include:

2-butyne-1,4-diol,
2-pentyne-1,4-diol
3-hexyne-2,5-diol
1-methyl-3-hexyne-2,5-diol
1,5-dimethyl-3-hexyne-2,5-diol
2,5-dimethyl-3-hexyne-2,5-diol
3,6-dimethyl-4-octyne-3,6-diol
4,7-dimethyl-5-decyne-4,7-diol
2,4,7,9-tetramethyl-5-decyne-4,7-diol 2-butyne-1,4-diphenyl-1,4-diol
2-butyne-1,4-dicyclohexyl-1,4-diol.

The following examples illustrate the preparation and properties of acetylenically unsaturated polyesters. All amounts given are by weight unless otherwise specified.

Example 1.—Isophthalic acid-2-butyne-1,4-diol polyester

A mixture of 0.86 g. (0.01 mole) of 2-butyne-1,4-diol, 2.03 g. (0.01 mole) of isophthaloyl chloride and 15 ml. of s-tetrachloroethane was refluxed in a 25 ml. round-bottom, 3-neck flask fitted with a reflux condenser, thermometer and gas inlet tube. Refluxing was continued for 27 hours while a stream of dry argon was bubbled through the reaction mass. During the initial stages of the polymerization the evolution of hydrogen chloride gas was rapid. Towards the end of this reflux period, the mixture had become viscous and slightly brown in color.

The reaction residue was dissolved in 50 ml. of chloroform. The resultant solution was filtered through a Celite bed prepared in chloroform and added slowly with stirring to 500 ml. of isopropanol contained in a 1 liter beaker. The polyester of isophthaloyl chloride and 2-butyne-1,4-diol was thus obtained as a white, fibrous polymer in a yield of 75% with a reduced viscosity of 0.75 when measured at 25° C. (0.2 gms./100 ml. of chloroform).

A film of this polymer, cast from chloroform exhibited the following physical properties:

| | |
|---|---|
| Tg (glass transition temperature) °C | 50 |
| Tm (melting point) °C | 100 |
| Tensile modulus (ASTM D–886–56T) p.s.i | 350,000 |
| Tensile strength (ASTM D–886–56T) p.s.i | 3,200 |
| Crystallinity by X-ray diffraction percent | 30 |

Example 2.—1,4-cis-cyclohexanedicarboxylic acid-2-butyne-1,4-diol polyester

Using the precedure described in Example 1, a polyester was obtained in a comparable yield of 1,4-cis-cyclohexanedicarboxylic acid-2-butyne-1,4-diol having a reduced viscosity of 1.1 at 25° C. when measured as a solution of 0.2 g. in 100 ml. of chloroform.

A film cast from chloroform showed the following physical properties:

| | |
|---|---|
| Tg (glass transition temperature) °C | 20–30 |
| Tensile modulus (ASTM D–882–56T) p.s.i | 33,000 |
| Tensile strength (ASTM D–882–56T) p.s.i | 3,200 |
| Elongation (ASTM D–882–56T) percent | 190 |
| Crystallinity by X-ray diffraction do | 0 |

The gas permeability of this film was measured according to the procedure described in ASTM D–1434–58. The permeability data obtained is recorded in Table 1 in units of cc. mil/100 in.² in 24 hours at one atmosphere differential pressure and compared with a Bisphenol-A polycarbonate sold under the trade name of Lexan and vinylidene chloride-vinyl chloride copolymer film sold under the trade name Saran. The polyester exhibited a much lower permeability to oxygen, nitrogen, hydrogen and carbon dioxide than did the Lexan and was comparable to Saran for nitrogen and oxygen permeability.

TABLE 1

| Polymer | Permeability (cc. mil/100 in.², 24 hrs. atms). | | | |
|---|---|---|---|---|
| | N₂ | O₂ | H₂ | CO₂ |
| Example 2 | 0.6 | 8.2 | 240 | 47 |
| Bisphenol-A Polycarbonate (Lexan) | 36 | 185 | 1,750 | 1,000 |
| Vinylidene chloride-vinyl chloride copolymer (Saran) | 0.2 | 1.3 | 6.0 | 2.0 |

Example 3.—Terephthalic acid-3-hexyne-2,5-diol polyester

When the apparatus and procedure described in Example 1 are use with a mixture of 2.03 g. (0.01 mole) of terephthaloyl chloride, 1.14 g. (0.01 mole) of 3-hexyne-2,5-diol and 15 ml. of s-tetrachloroethane, a crystalline 3-hexyne-2,5-diol terephthalate polyester is obtained comparable in physical properties to the acetylenically unsaturated polyester described in Example 1.

Glass transition temperatures (Tg), commonly referred to as second order phase transition temperatures refer to the inflection temperatures found by plotting the resilience (recovery from 1 percent elongation) of a film, ranging in thickness from 3–15 mils, against the temperature. A detailed explanation for determining resilience and inflection temperature is to be found in an article by Alexander Brown in "Textile Research Journal" volume 25, 1955 at page 891.

It is not necessary to utilize only one combination of acetylenic glycol and diacyl chloride at a time in each polymerization. Mixtures of two or more glycols and/or diacyl chlorides can be polymerized as well.

The acetylenically unsaturated polyesters of this invention have been discovered to be crosslinkable to tough thermoset resins, which are insoluble in most organic solvents and infusible up to 300° through the simple expedient of heating to temperatures of about 200 to 250° C. This constitutes a further advantage of having triple bonds in a polyester backbone as sites for further reaction. These thermoset resins can be utilized as protective coatings for various metallic and polymeric substrates. The uncrosslinked polyesters can be empolyed in manufacturing films for packaging in general, and for packaging food in particular because of their low moisture and oxygen permeability. The crystalline polyesters can be utilized as fibers and as adhesives.

Acetylenically unsaturated polycarbonates

The preferred process for the preparation of acetylenically unsaturated polycarbonates is the interfacial polycondensation (polymerization) of an acetylenic glycol (diol) dichloroformate with a bisphenol. Other dihaloformates can also be used, if desired, such as the dibromo-, difluoro- or diiodoformates.

The preparation of high molecular weight acetylenically unsaturated polycarbonates requires that the reactants be in a polymerizable substantially high state of purity. Polymerization will still occur in the presence of impurities but low molecular weight polymers (reduced viscosities of less than 0.1 at 25° C.) will probably result. This requirement of purity is particularly difficult to meet in the case of the dihaloformate reactants since they are unstable to heat when synthesized in the presence of a base (as an acid acceptor) and hence cannot be purified by fractional distillation. Thus, for example, in the preparation of the dichloroformate of 2-butyne-1,4-diol which can be readily effected with phosgene in the presence of an organic base, the formation of 2-butyne-1,4-dichloride as a contaminant is catalyzed by this same organic base and, therefore, is difficult to avoid.

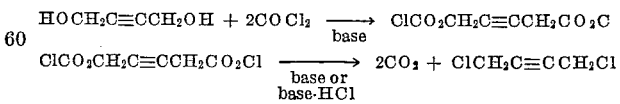

If no base is used, this reaction is extremely sluggish and at best uneconomical.

However, this problem was solved by filtering the crude dichloroformate product through a column of magnesia-silica (trade name Florisil) thus quantitatively removing any base or base hydrochloride and stabilizing the dichloroformate so that it can be purified by fractional distillation.

The formation of acetylenically unsaturated polycarbonates is represented graphically with the dichloroformate of 2-butyne-1,4-diol and Bisphenol-A, 2,2-bis-(4-hydroxyphenyl)-propane.

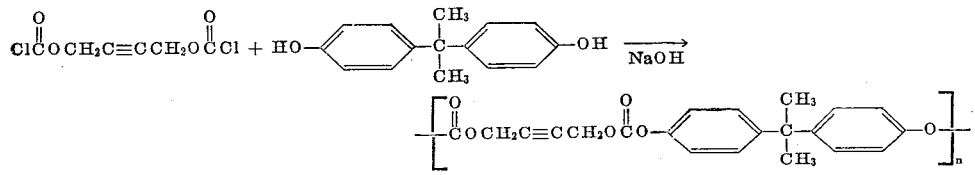

wherein n is an integer having a value sufficiently high to afford a solid polymer.

An acceptable alternate procedure involves the interaction of a dihaloformate of a bisphenol with a free acetylenically unsaturated diol.

The acetylenic glycols previously listed for the synthesis of polyesters can be used for the preparation of polycarbonates too, although the invention is not limited to this listing.

Preferred bisphenols include 2,2 - bis - (4-hydroxyphenyl)propane, bis(4-hydroxyphenyl)sulfone, 1,3-bis (p-hydroxyphenyl)-1 - ethylcyclohexane, the bisphenol reaction products of α-pinene or its isomers with phenol as well as halogen substituted analogs of these bisphenols. Three products arise from the reaction of phenol with α-pinene identified hereinafter as α-bisphenol, β-bisphenol and γ-bisphenol, having the structures shown below:

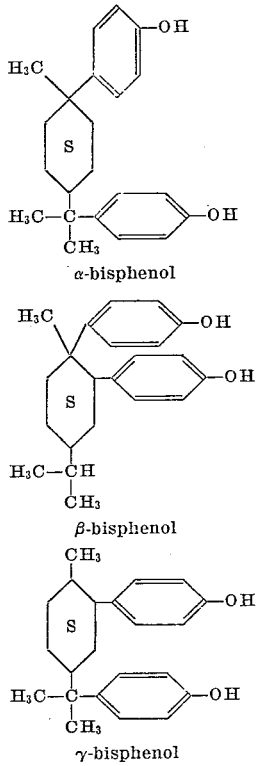

The list of bisphenols given previously can also be employed for preparing these polycarbonates.

It is preferred to employ stoichiometric quantities of dihaloformate and bisphenol for the obtainment of high molecular weight polymers. Nevertheless molar ratios of up to about 50:1 with either reactant in excess can be utilized.

The formation of polycarbonates in this invention can be achieved in a temperature range of about −10° to 50° C. as well as others with about 0 to 30° C. being a preferred range.

The preferred solvents in this process are aromatic hydrocarbons, e.g., benzene, toluene, xylenes and the like; and chlorinated aliphatic hydrocarbons, e.g., methylene chloride, chloroform, carbon tetrachloride and the like.

This condensation is usually conducted in the presence of alkali metal oxides and hydroxides such as sodium hydroxide, potassium hydroxide, lithium hydroxide, and the like, alkaline earth metal oxides and hydroxides such as calcium oxide, barium oxide, calcium hydroxide, barium hydroxide, magnesium hydroxide and the like. In addition, catalytic amounts of tertiary amines such as triethylamine, tripropylamine and benzyldimethyl amine can also be added.

The polycarbonate produced can be isolated by evaporation of the organic solvent or by coagulation in a precipitating solvent which is miscible with the first solvent. For this purpose, an aliphatic alcohol such as methanol, ethanol, isopropanol or the like is satisfactory.

No particular pressures are needed to carry out this syntheses. Atmospheric pressures are preferred because they are the simplest to work with.

The following examples illustrate the preparation of acetylenically unsaturated polycarbonates with all parts and percentages given by weight unless otherwise specified.

Example 4.—Preparation of the dichloroformate of 2-butyne-1,4-diol

Into a two-liter, three-neck, Morton flask equipped with a mechanical stirrer, reflux condenser and dropping funnel were placed 17.2 g. (0.2 mole) of 2-butyne-1,4-diol, 300 ml. of methylene chloride and 30.7 ml. of liquid phosgene (0.44 mole). The flask was cooled to about 5° C. to maintain the phosgene in the liquid phase. A solution of 48.4 g. (0.4 mole) of N,N-dimethylaniline in 100 ml. of methylene chloride was then added dropwise with stirring over a period of about 21 minutes while the temperature was kept between 5 and 13° C. Stirring was continued for about 30 minutes after which the contents of the flask were stripped free of volatile components in vacuo at about 30 to 35° C. The oily yellow residue, the dichloroformate of 2-butyne-1,4-diol contaminated with N,N-dimethylaniline hydrochloride was extracted with 400 ml. of cold diethyl ether in which the dichloroformate dissolved leaving the N,N-dimethylaniline hydrochloride as a solid, white residue. This mixture was filtered through a Buchner filter and the solid washed with 100 ml. of cold diethyl ether. The combined ether fractions were filtered through a bed of Celite (trade name for diatomaceous silica filter aids), and evaporated in vacuo. The dichloroformate residue was dissolved in 300 ml. of dry benzene and filtered through a column of magnesia-silica (trade name Florisil) 5 inches long and 1.5 inches in diameter. The colorless dichloroformate remaining after evaporation was further purified by vacuum distillation, affording a yield of 71% B.P. 85–92° C./0.4–0.6 mm., $n_D^{25}=1.4770$. The identity of the dichloroformate of 2-butyne-1,4-diol was confirmed by microanalysis for carbon, hydrogen and chlorine and examination of the infra spectrum which showed a carbonyl absorption band at 5.65 microns and a C0–Cl absorption band at 14.6 microns.

Calculated: C, 34.15%; H, 1.91%; Cl, 33.61%. Found: C, 34.85%; H, 2.64%; Cl, 33.26%.

Example 5.—Preparation of a polycarbonate from 2-butyne-1,4-diol dichloroformate and α-bisphenol Into a 250 ml., three-neck Morton flask equipped as in Example 4, containing 3.24 g. (0.01 mole) of α-bisphenol, 1 g. of NaOH, 50 ml. of distilled water, 5 drops of triethylamine and 30 ml. of methylene chloride, was added dropwise, a solution comprising 2.11 g. (0.01 mole) of 2-butyne-1,4-diol dichloroformate in 30 ml. of methylene chloride from the dropping funnel with vigorous stirring. The addition took 12 minutes after which stirring was continued for an additional 20 minutes. After 10 minutes, 5 drops of triethyl amine was added. The organic layer was washed with three successive 200 ml. quantities of water, followed by a wash with 100 ml. of distilled water containing 3 ml. of concentrated (87%) orthophosphoric acid. After stirring for 30 minutes the aqueous layer had a pH of 1.4. The aqueous layer was decanted and the organic layer washed repeatedly with distilled water, each wash being accompanied with stirring for 15 minutes in the Morton flask. Finally the aqueous layer showed a pH of 5 to 7. Six to seven washes were needed to reach this degree of neutrality.

The organic layer was added slowly with stirring to a one liter beaker containing 600 ml. of isopropanol. A white, fibrous polycarbonate was obtained in a yield of 80% having a strong carbonyl absorption band at 5.7 microns. The reduced viscosity of a 0.2 g. solution in 100 ml. of chloroform at 25° C. was 0.99.

Example 6.—Preparation of a polycarbonate from Bisphenol-A Bisphenol-A dichloroformate and 2-butyne-1,4-diol dichloroformate The apparatus and procedure described in Example 3 was used with a charge of 2.28 g. (0.01 mole) of Bisphenol-A, 1 g. of NaOH, 50 ml. of water, 4 drops of formate and 0.35 g. (0.001 mole) of Bisphenol-A dition of 1.9 g. (0.009 mole) of 2-butyne-1,4-diol dichloroformate and 0.35 g. (0.001 mole) of Bisphenol-A dichloroformate in 30 ml. of methylene chloride was added through the dropping funnel. The 2-butyne-1,4-diol polycarbonate thus obtained in a yield of 70% had a reduced viscosity of 0.39 (0.2 g. solution in 100 ml. of chloroform at 25° C.).

Example 7.—Magnesium catalyzed polycarbonate process

The apparatus described in Example 3 was employed to reflux a charge of 2.28 g. (0.01 mole) of Bisphenol-A, 2.11 g. (0.01 mole) of 2-butyne-1,4-diol dichloroformate, 60 ml. of chlorobenzene and 0.06 g. (0.0025 mole) of magnesium powder for 46 hours while a stream of dry argon was passed through the mixture. The HCl evolved was swept out of the reactor by the argon. The viscous reaction mixture was then filtered through a Celite bed and precipitated in a beaker containing 500 ml. of isopropanol. The yield of white polycarbonate of 2-butyne-1,4-diol was 80% and showed a reduced viscosity of 0.16 (0.2 g. solution in 100 ml. of chloroform at 25° C.).

Example 8.—Pyridine process for the preparation of polycarbonate from 2-butyne-1,4-diol and Bisphenol-A dichloroformate A solution of 3.53 g. (0.01 mole) of Bisphenol-A dichloroformate dissolved in 50 ml. of dry pyridine was placed in a 250 ml., three-neck Morton flask provided with a reflux condenser and mechanical stirrer and immersed in an ice bath which brought the flask contents to a temperature of 5° C. A slurry of 0.86 g. (0.01 mole) of 2-butyne-1,4-diol in 25 ml. of methylene chloride was added to the cooled solution. Stirring was initiated. After 15 minutes the ice bath was removed and stirring continued for an additional 45 minutes. The reaction mixture was coagulated in 500 ml. of isopropanol affording a Bisphenol-A polycarbonate of 2-butyne-1,4-diol having a reduced viscosity of 0.15 (0.2 g. solution in 100 ml. of chloroform at 25° C.).

Example 9.—Comparison of various acetylenically unsaturated polycarbonates

The equipment and procedure described in Example 3 was used to prepare polycarbonates from the dichloroformate of 2-butyne-1,4-diol and various bisphenols. The yields and reduced viscosities of the resultant polycarbonates are delineated in Table 1.

TABLE 1.—POLYCARBONATES FROM 2-BUTYNE-1,4-DIOL DICHLOROFORMATE AND BISPHENOLS

| No. | Bisphenol | Polycarbonate Yield (Percent) | Reduced Viscosity [1] |
|---|---|---|---|
| 1 | 2,2-bis-(4-hydroxyphenyl)-propane. | 67 | 0.47 |
| 2 | 1,3-bis-(p-hydroxyphenyl)-1-ethylcyclohexane. | 80 | 0.83 |
| 3 | α-bisphenol. | 80 | 0.99 |
| 4 | 2,2-bis-(2,3,4,6-tetrachloro-4-hydroxyphenyl)propane. | 65 | 0.31 |
| 5 | Acetophenone bisphenol | 75 | 0.30 |
| 6 | 2,2-bis-(2,6-dichloro-4-hydroxyphenyl)propane. | 70 | 0.43 |
| 7 | Cyclohexanone bisphenol | | 0.26 |
| 8 | Bis-(4-hydroxyphenyl)sulfone | 75 | 0.18 |
| 9 | Bisphenol of 1,4-dimethylenecyclohexane. | 75 | 0.56 |
| 10 | Bisphenol of α,α'-dichloro-p-xylene. | 69 | [2] 0.64 |
| 11 | Bisphenol from di(chloromethyl)-durene. | 75 | 0.38 |
| 12 | β-bisphenol/γ-bisphenol (60/40 mixture). | 81.2 | 0.99 |
| 13 | γ-bisphenol | 60 | 0.53 |

[1] All measurements made in CHCl₃ at 25° C. (0.2 g. solution in 100 ml. of CHCl₃) except No. 10.
[2] No. 10 measured in m-cresol at 25° C. (0.2 g. solution in 100 ml. of m-cresol).

Reduced viscosity values can be obtained from the equation:

$$\text{Reduced viscosity} = \frac{t_s - t_o}{C \cdot t_o}$$

wherein:
$t_o$ is the efflux time of the pure solvent;
$t_s$ is the efflux time of the polymer solution;
C is the concentration of the polymer solution expressed in terms of grams of polymer per 100 ml. of solution.

The physical properties of the above polycarbonates are summarized in Table 2.

TABLE 2

| No. | RV[1] | Tg (° C.) | Tensile Strength (p.s.i.) | Tensile Modulus (p.s.i.) | Elongation (Percent) | Pendulum Impact Strength (ft. lbs./in.³) |
|---|---|---|---|---|---|---|
| 1 | 0.47 | 70–90 | 5,000 | 315,000 | 7 | 10 |
| 2 | 0.83 | 110 | 9,300 | 350,000 | 6 | 30–45 |
| 3 | 0.99 | 90–100 | 6,000 | 265,000 | 35 | 50–60 |
| 5 | 0.30 | 90 | 2,300 | 285,000 | | |
| 6 | 0.43 | 45 | 4,200 | 210,000 | 2–16 | 20 |
| 7 | 0.26 | 50 | | | | |
| 9 | 0.56 | 130 | 8,000 | 280,000 | 4–25 | 40 |
| 10 | [2] 0.64 | 65–70 | | 330,000 | | |
| 11 | 0.38 | 100 | | | | |
| 12 | 0.99 | 135 | 6,500 | 230,000 | 20 | 60 |
| 13 | 0.53 | 150 | 7,100 | 240,000 | 65 | 120 |

[1] Measured in chloroform at 25° C. (0.2 g. solution in 100 ml. of chloroform) except for No. 10.
[2] Measured in m-cresol at 25° C. (0.2 g. solution in 100 ml. of m-cresol).

Pendulum impact was measured by ASTM D–256–56 modified as follows: A steel pendulum was used, cylindrical in shape with a diameter of 0.95 inch and weighing 1.562 pounds. The striking piece, mounted almost at the top of the pendulum was a cylinder 0.3 inch in diameter. Film specimens, 1.5 inches long, 0.125 inch wide and about 0.01 inch thick were clamped between the jaws of the tester so that the jaws were spaced 1 inch apart. The 0.125 inch width of the film was mounted vertically. The pendulum was raised to a constant height to deliver 1.13 foot pounds at the specimen. When the pendulum was released the cylindrical striking piece hit the specimen with its flat end, broke the film, and traveled to a measured height beyond. The difference between the height traveled with no film present and the height traveled with film present was converted to energy in foot-pounds. On dividing this value by the volume of that portion of the sample located between the jaws of the tester, the tensile impact strength in foot-pounds per cubic inch was obtained.

In order to demonstrate the stiffening effect of a triple bond in a polymer chain, the Tg's of several acetylenically unsaturated polycarbonates prepared from 2-butyne-1,4-diol were compared with saturated polycarbonates made from the corresponding saturated diol, 1,4-butane diol. These data compiled in Table 3 show higher Tg values in polymers containing triple bonds identified as "butyne polymers" in contradistinction to saturated polymers identified as "butane polymers."

TABLE 3.—Tg OF POLYCARBONATES DERIVED FROM 2-BUTYNE-1,4-DIOL AND FROM 1,4-BUTANEDIOL

| Bisphenol Moiety | Butyne Polymers | | Butane Polymers | |
|---|---|---|---|---|
| | Tg (° C.) | RV [1] | Tg (° C.) | RV [1] |
| 2,2-bis-(4-hydroxyphenyl) propane | 70–90 | 0.47 | 70 | 0.39 |
| β-bisphenol/γ-bisphenol (60/40 mixture) | 135 | 0.99 | 125 | 1.44 |
| 1,3-bis-(p-hydroxyphenyl)-1-ethylcyclohexane | 110 | 0.83 | 105 | 1.24 |

[1] Reduced viscosity as defined above.

Example 10.—Preparation of polycarbonate from Bisphenol-A and 1,4-diphenyl-2-butyne-1,4-diol dichloroformate Using the equipment and procedure described in Example 5 with 2.28 g. (0.01 mole) of Bisphenol-A, 1 g. of NaOH, 50 ml. of distilled water, 5 drops of triethylamine, 30 ml. of methylene chloride and 3.62 g. (0.01 mole) of 1,4-diphenyl-2-butyne-1,4-diol dichloroformate in 30 ml. of methylene chloride, a Bisphenol-A polycarbonate of 1,4-diphenyl-2-butyne-1,4-diol dichloroformate is obtained. The physical properties of this substituted acetylenically unsaturated polycarbonate are similar to those of the product described in Example 5.

These acetylenically unsaturated polycarbonates can be employed in the fabrication of molded parts, requiring high impact strength and form stable properties, such as gears, sprockets, cams and the like. They can also be used as adhesives, as supporting films for photographic emulsions and as electrical insulation materials.

Acetylenically unsaturated polyurethanes

The preferred process for the preparation of acetylenically unsaturated polyurethanes is the interfacial condensation of an acetylenic glycol dichloroformate with a secondary diamine such as piperazine, 2,5-dimethylpiperazines and other substituted isomeric piperazines. If desired, the dichloroformate may be replaced by other halogen formates as for example, the dibromo-, diiodo- or difluoroformate of the diol.

The synthesis of acetylenically unsaturated polyurethanes is demonstrated graphically below by the reaction of 2-butyne-1,4-diol dichloroformate with trans-2,5-dimethylpiperazine.

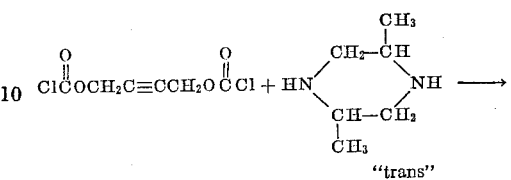

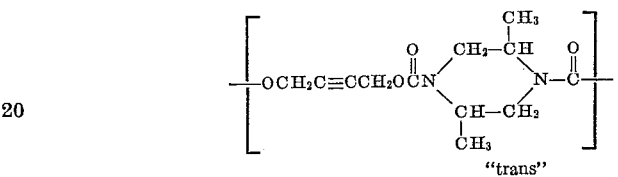

Acetylenically unsaturated polymers containing both polycarbonate and polyurethane moieties can also be prepared by allowing 2-butyne-1,4-diol dichloroformate to react with both a bisphenol and a secondary diamine in the same reactor. Such a synthesis can be depicted graphically with Bisphenol-A, trans-2,5-dimethylpiperazine and 2-butyne-1,4-diol dichloroformate as giving rise to the repeating structure shown below:

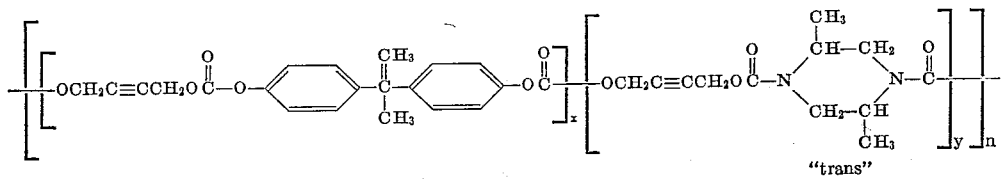

wherein $n$ is an integer having a value sufficiently high to afford a solid polymer, $x$ and $y$ are integers and the ratio $x/y$ is determined by the ratio of diamine/bisphenol charged.

The preparation of polyurethanes and poly(carbonate-urethane) is illustrated by the following examples. All parts and percentages given are by weight unless otherwise specified.

Example 11.—Polyurethane from 2-butyne-1,4-diol dichloroformate and trans-2,5-dimethylpiperazine In the apparatus described in Example 4, was placed 1.14 g. (0.01 mole) of trans-2,5-dimethylpiperazine, 15 ml. of water, 1 g. of sodium hydroxide, 3 drops of triethylamine and 20 ml. of methylene chloride. To this mixture was added with stirring, a solution of 2.11 g. (0.01 mole) of 2-butyne-1,4-diol dichloroformate in 20 ml. of methylene chloride, dropwise. A 96.8% yield of butyne-polyurethane was obtained by evaporation of the organic layer. This polymer had a softening point of about 75° C., was soluble in alcohols such as isopropanol and had a reduced viscosity of 0.28 (0.2 g. solution in 100 ml. of chloroform at 25° C.).

Example 12.—Poly(carbonate-urethane) from Bisphenol-A, trans-2,5-dimethylpiperazine and 2-butyne-1,4-diol dichloroformate The procedure of Example 8 was followed with a solution of 1.8 g. (0.008 mole) of Bisphenol-A, 0.228 g.

(0.002 mole) of trans-2,5-dimethylpiperazine, 1 g. of sodium hydroxide, 30 ml. of distilled water, 3 drops of triethylamine and 10 ml. of methylene chloride. To this solution was added 2.11 g. (0.01 mole) of 2-butyne-1,4-diol dichloroformate in 20 ml. of methylene chloride. Evaporation of the organic layer afforded a 96% yield of butyne poly(carbonate-urethane) having a reduced viscosity of 0.27 (0.2 g. solution in 100 ml. of chloroform at 25° C.); percent N found, 1.58; percent $n$ calculated 1.63. The infrared spectrum was in accord with the proposed structure in having an absorption band 5.7 microns (carbonate) and at 5.9 microns (urethane).

Example 13.—Poly(carbonate-urethane) from 2-butyne-1,4-diol dichloroformate, trans-2,5-dimethylpiperazine and a 60:40 mixture of β-bisphenol and γ-bisphenol The procedure described in Example 12 was followed with comparable molar quantities, but with a 90:10 molar ratio of a 60:40 mixture of β-bisphenol and γ-bisphenol to piperazin. The butyne poly(carbonate-urethane) had a reduced viscosity of 0.60 (0.2 g. solution in 100 ml. of chloroform at 25° C.), Tg=120° C., tensile strength 8,900 p.s.i., tensile modulus=275,000 p.s.i., elongation=4.5% and a pendulum impact=25 ft. lbs./in.³.

Example 14.—Poly(carbonate-urethane) from 2-butyne-1,4-diol dichloroformate, trans-2,5-dimethylpiperazine, and 1,3-bis-(p-hydroxyphenyl)-1-ethylcyclohexane The procedure of Example 12 was followed with comparable molar quantities except that the molar ratio of bisphenol to piperazine was 82.5 to 17.5. The resultant butyne poly(carbonate-urethane) had a reduced viscosity of 0.49 (0.2 g. solution in 100 ml. of chloroform at 25° C.), Tg=80° C., tensile strength=9,800 p.s.i., tensile modulus=340,000 p.s.i., elongation=4.5% and pendulum impact strength=30 ft. lbs./in.³.

These butyne poly(carbonate-urethanes) can be crosslinked to form tough thermoset resins by heating for about 5 to 15 minutes at about 190 to 220° C. These resins can be used for the fabrication of various molded articles such as trays, containers, covers and the like as well as coatings for metals and electrical insulation materials.

Both the polyurethanes and poly(carbonate-urethanes) can be used in the uncrosslinked thermoplastic state for the fabrication of molded articles and as adhesives.

Although the invention has been described in its preferred forms with a certain degree of particularity, it is understood that the present disclosure of the preferred forms has been made only by way of example, and that numerous changes may be resorted to without departing from the spirit and the scope of the invention.

What is claimed is:
1. In the process of preparing an essentially linear, normally solid, acetylenically unsaturated polycarbonate consisting essentially of the repeating unit having the structure

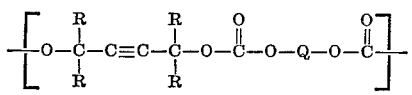

wherein each R is a monovalent radical selected from the class consisting of hydrogen and lower hydrocarbon groups and Q is an arylene radical, which comprises contacting a dihaloformate of an acetylenic diol with a dihydric phenol, the improvement which consists essentially of quantitatively removing organic base impurities from said dihaloformate, prior to contact with the dihydric phenol, by filtration through a column of magnesia-silica.

2. The process claimed in claim 1 wherein the acetylenic diol is 2-butyne-1,4-diol.

3. The process claimed in claim 1 wherein the dihydric phenol is 2,2-bis(4-hydroxyphenyl) propane.

4. The process claimed in claim 1 wherein the dihydric phenol is bis(4-hydroxyphenyl) sulfone.

5. The process claimed in claim 1 wherein the dihydric phenol is 1,3-bis(p-hydroxyphenyl)-1-ethylcyclohexane.

6. The process claimed in claim 1 wherein the dihydric phenol is a reaction product of alpha-pinene with phenol.

References Cited

UNITED STATES PATENTS

| 3,321,440 | 5/1967 | Lee | 260—47 |
| 3,043,800 | 7/1962 | Schnell et al. | 260—47 |
| 3,164,564 | 1/1965 | Butterworth et al. | 260—47 |

OTHER REFERENCES

N. Rabjohn et al., J. Am. Chem. Soc. 74, 3215 (1952).

WILLIAM H. SHORT, *Primary Examiner.*

SAMUEL H. BLECH, *Examiner.*

M. GOLDSTEIN, *Assistant Examiner.*